United States Patent
Jalali et al.

(10) Patent No.: US 9,295,006 B2
(45) Date of Patent: Mar. 22, 2016

(54) REAL-TIME CALIBRATION OF AN AIR TO GROUND COMMUNICATION SYSTEM

(75) Inventors: Ahmad Jalali, Rancho Santa Fe, CA (US); Mohammad A. Tassoudji, Cardiff, CA (US); Ernest T. Ozaki, Poway, CA (US); William G. Ames, San Diego, CA (US); Leonard N. Schiff, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 13/168,617

(22) Filed: Jun. 24, 2011

(65) Prior Publication Data

US 2012/0202418 A1    Aug. 9, 2012

Related U.S. Application Data (60) Provisional application No. 61/441,231, filed on Feb. 9, 2011.

(51) Int. Cl.
*H04M 1/00* (2006.01)
*H04B 15/00* (2006.01)
*H04B 7/00* (2006.01)
(Continued)

(52) U.S. Cl.
CPC ........... *H04W 52/241* (2013.01); *H01Q 1/2291* (2013.01); *H01Q 1/246* (2013.01); *H01Q 1/28* (2013.01); *H01Q 3/24* (2013.01); *H01Q 3/26* (2013.01); *H01Q 13/02* (2013.01); *H01Q 21/062* (2013.01); *H01Q 21/205* (2013.01);
(Continued)

(58) Field of Classification Search
CPC ..... H01Q 13/02; H01Q 1/2991; H01Q 1/246; H01Q 1/28; H01Q 21/062; H01Q 21/205; H01Q 25/00; H01Q 3/24; H01Q 3/26; H04B 7/18506
USPC ................ 455/67.11, 68–69, 63.1, 63.4, 561, 455/562.1
See application file for complete search history.

(56) References Cited

U.S. PATENT DOCUMENTS

| | | |
|---|---|---|
| 3,946,395 A | 3/1976 | Kirchhoff |
| 5,123,112 A | 6/1992 | Choate |

(Continued)

FOREIGN PATENT DOCUMENTS

| | | |
|---|---|---|
| CN | 101489236 A | 7/2009 |
| CN | 101536360 A | 9/2009 |

(Continued)

OTHER PUBLICATIONS

International Search Report and Written Opinion—PCT/US2012/024540—ISA/EPO—Apr. 23, 2012.

(Continued)

*Primary Examiner* — Ping Hsieh
*Assistant Examiner* — Xin Jia
(74) *Attorney, Agent, or Firm* — Liberty E. Mann (57) ABSTRACT

A method for real-time calibration of an air to ground two-way communication system. The method includes calibrating a ground base station antenna array according to forward link calibration coefficients received from an aircraft as part of a communication signaling protocol during operation of the air to ground two-way communication system. The method may also includes communicating between the ground base station antenna array and the aircraft over a narrow beam.

20 Claims, 9 Drawing Sheets

(51) Int. Cl.
| | |
|---|---|
| *H04W 52/24* | (2009.01) |
| *H01Q 1/22* | (2006.01) |
| *H01Q 1/24* | (2006.01) |
| *H01Q 1/28* | (2006.01) |
| *H01Q 3/24* | (2006.01) |
| *H01Q 3/26* | (2006.01) |
| *H01Q 13/02* | (2006.01) |
| *H01Q 21/06* | (2006.01) |
| *H01Q 21/20* | (2006.01) |
| *H01Q 25/00* | (2006.01) |
| *H04B 7/185* | (2006.01) |
| *H04W 84/00* | (2009.01) |

(52) U.S. Cl.
CPC .......... *H01Q 25/00* (2013.01); *H04B 7/18506* (2013.01); *H04W 84/005* (2013.01)

(56) References Cited

U.S. PATENT DOCUMENTS

| | | | |
|---|---|---|---|
| 5,444,762 | A | 8/1995 | Frey et al. |
| 6,104,926 | A | 8/2000 | Hogg et al. |
| 6,311,075 | B1 | 10/2001 | Bevan et al. |
| 6,426,720 | B1 | 7/2002 | Ross et al. |
| 6,473,619 | B1 | 10/2002 | Kong et al. |
| 6,642,894 | B1 | 11/2003 | Gross et al. |
| 6,791,507 | B2 | 9/2004 | Johansson et al. |
| 6,963,742 | B2 * | 11/2005 | Boros et al. ............. 455/424 |
| 7,084,811 | B1 | 8/2006 | Yap |
| 7,187,950 | B2 | 3/2007 | Hintermeier et al. |
| 7,193,574 | B2 | 3/2007 | Chiang et al. |
| 7,304,605 | B2 | 12/2007 | Wells |
| 7,310,380 | B1 | 12/2007 | Young et al. |
| 7,392,015 | B1 * | 6/2008 | Farlow et al. ............. 455/562.1 |
| 7,414,578 | B1 | 8/2008 | Courtade et al. |
| 7,567,213 | B2 | 7/2009 | Liu |
| 7,684,802 | B2 | 3/2010 | Jalali |
| 7,751,814 | B2 | 7/2010 | Cruz et al. |
| 8,639,265 | B1 | 1/2014 | Gauba et al. |
| 2002/0071406 | A1 | 6/2002 | Bursztejn et al. |
| 2002/0101913 | A1 | 8/2002 | Masters et al. |
| 2003/0069043 | A1 | 4/2003 | Chhaochharia et al. |
| 2003/0128671 | A1 | 7/2003 | Niesen |
| 2003/0198201 | A1 * | 10/2003 | Ylitalo et al. ............. 370/329 |
| 2004/0127260 | A1 | 7/2004 | Boros et al. |
| 2004/0158863 | A1 | 8/2004 | McLain |
| 2005/0030248 | A1 | 2/2005 | Gabriel et al. |
| 2005/0187677 | A1 | 8/2005 | Walker |
| 2005/0213527 | A1 | 9/2005 | Xie |
| 2006/0009162 | A1 * | 1/2006 | Tan et al. ............. 455/67.11 |
| 2006/0030311 | A1 | 2/2006 | Cruz et al. |
| 2006/0040614 | A1 | 2/2006 | Chapelle et al. |
| 2006/0229076 | A1 | 10/2006 | Monk |
| 2006/0229077 | A1 | 10/2006 | Monk |
| 2006/0229103 | A1 * | 10/2006 | Monk ............. 455/562.1 |
| 2007/0183545 | A1 | 8/2007 | Yuda et al. |
| 2008/0102812 | A1 | 5/2008 | Chari et al. |
| 2008/0174488 | A1 | 7/2008 | Weinstein et al. |
| 2008/0240029 | A1 | 10/2008 | Lynch et al. |
| 2008/0240038 | A1 | 10/2008 | Lynch et al. |
| 2008/0266166 | A1 | 10/2008 | Schuchman |
| 2009/0185533 | A1 * | 7/2009 | Kim et al. ............. 370/329 |
| 2009/0186611 | A1 | 7/2009 | Stiles et al. |
| 2009/0233545 | A1 * | 9/2009 | Sutskover et al. ............. 455/25 |
| 2010/0098030 | A1 | 4/2010 | Wang et al. |
| 2010/0117890 | A1 | 5/2010 | Vook et al. |
| 2011/0034190 | A1 | 2/2011 | Leabman |
| 2011/0134889 | A1 | 6/2011 | Harvey et al. |
| 2011/0263199 | A1 | 10/2011 | Cruz et al. |
| 2011/0265128 | A1 | 10/2011 | Bengeult et al. |
| 2012/0200458 | A1 | 8/2012 | Jalali et al. |
| 2012/0202430 | A1 | 8/2012 | Jalali et al. |
| 2013/0182790 | A1 | 7/2013 | Jalali et al. |
| 2014/0150034 | A1 | 5/2014 | Frisco et al. |
| 2014/0200045 | A1 | 7/2014 | Jalali et al. |

FOREIGN PATENT DOCUMENTS

| | | | |
|---|---|---|---|
| DE | 102009019995 | A1 | 11/2010 |
| EP | 0807989 | A1 | 11/1997 |
| EP | 1143751 | A1 | 10/2001 |
| EP | 1271694 | A2 | 1/2003 |
| EP | 2161855 | A1 | 3/2010 |
| EP | 2200190 | A2 | 6/2010 |
| JP | H10117162 | A | 5/1998 |
| JP | H11205222 | A | 7/1999 |
| JP | 2003078328 | A | 3/2003 |
| JP | 2006505155 | A | 2/2006 |
| JP | 2006081158 | A | 3/2006 |
| JP | 2010508773 | A | 3/2010 |
| JP | 2011019067 | A | 1/2011 |
| JP | 2012502527 | A | 1/2012 |
| WO | 9943048 | A1 | 8/1999 |
| WO | 9945609 | A1 | 9/1999 |
| WO | 03103247 | A1 | 12/2003 |
| WO | 2005060142 | A1 | 6/2005 |
| WO | 2006060197 | A1 | 6/2006 |
| WO | 2006123227 | A2 | 11/2006 |
| WO | 2006124063 | A2 | 11/2006 |
| WO | 2008054936 | A2 | 5/2008 |
| WO | 2010025997 | A1 | 3/2010 |
| WO | WO-2010055749 | A1 | 5/2010 |
| WO | WO2010060953 | A1 | 6/2010 |
| WO | WO2010092082 | A1 | 8/2010 |

OTHER PUBLICATIONS

Pace et al., "Wireless communication networks via aerial platforms: Dynamic fair power sharing admission control for UMTS real time traffic sources", IEEE International Conference on Telecommunications and Malaysia International Conference on Communications (ICT-MICC), May 14, 2007, pp. 616-621, IEEE, XP031228661, ISBN: 978-1-4244-1093-4.

Pearce et al., "Optimum antenna configurations for millimetre-wave communications from high-altitude platforms", IET Communications, Jun. 1, 2007, pp. 359-364, vol. 1, No. 3, XP006028858.

Yu Chiann Foo et al., "Centralized downlink call admission control for high altitude platform station UMTS with onboard power resource sharing", Proceedings of IEEE 56th Vehicular Technology Conference, Sep. 24, 2002, pp. 549-553, vol. 1, IEEE, XP010608617, ISBN: 978-0-7803-7467-6.

Taiwan Search Report—TW101104229—TIPO—Feb. 25, 2014.

* cited by examiner

REAL-TIME CALIBRATION OF AN AIR TO GROUND COMMUNICATION SYSTEM

CROSS-REFERENCE TO RELATED APPLICATION

The present Application for Patent claims the benefit of U.S. Provisional Application No. 61/441,231 filed Feb. 9, 2011, in the names of M. Tassoudji et al. and assigned to the assignee hereof and hereby expressly incorporated by reference herein in its entirety.

This application is related to commonly assigned U.S. patent application entitled "HIGH DATA RATE AIRCRAFT TO GROUND COMMUNICATION ANTENNA SYSTEM," in the names of A. JALALI et al. Ser. No. 13/168,538 and commonly assigned U.S. patent application entitled "GROUND STATION ANTENNA ARRAY FOR AIR TO GROUND COMMUNICATION SYSTEM" in the names of A. JALALI et al., Ser. No. 13/168,623, the disclosures of which are expressly incorporated by reference herein in their entireties.

BACKGROUND

1. Field

Aspects of the present disclosure relate generally to wireless communication systems, and more particularly for providing Internet services to aircraft.

2. Background

Two main approaches provide Internet access to airplanes. In one approach, an Air to Ground (ATG) system uses terrestrial Ground Base Stations (GBS) using cellular communication techniques to provide Internet access to aircraft flying over land. A currently used ATG system operating over the continental United States uses only 3 MHz of spectrum. Although, this system may become commercially viable, the limited spectrum may be inadequate to accommodate increasing demand for Internet services, such as streaming of Internet content to aircraft. In another approach, satellite links provide Internet service to aircraft. The satellite based systems have more spectrum available but their cost is excessive.

Because of the excessive cost of satellite links for aircraft Internet communication, it has been preferable to utilize the terrestrial based ATG systems. It would be desirable to increase available spectrum for ATG and provide techniques that would allow such systems to accommodate the increasing demands for aircraft Internet service without substantially increasing cost.

SUMMARY

According to one aspect of the present disclosure, a method for real-time calibration of an air to ground two-way communication system is described. The method includes calibrating a ground base station antenna array according to forward link calibration coefficients received from an aircraft as part of a communication signaling protocol during operation of the air to ground two-way communication system. The method may also include communicating between the ground base station antenna array and the aircraft over a narrow beam.

In another aspect, an apparatus for real-time calibration of an air to ground two-way communication system is described. The apparatus includes means for calibrating a ground base station antenna array according to forward link calibration coefficients received from an aircraft as part of a communication signaling protocol during operation of the air to ground two-way communication system. The apparatus may further include means for communicating between the ground base station antenna array and the aircraft over a narrow beam.

In another aspect, a computer program product for real-time calibration of an air to ground two-way communication system is described. The computer program product includes a computer-readable medium having program code recorded thereon. The computer program product has program code to calibrate a ground base station antenna array according to forward link calibration coefficients received from an aircraft as part of a communication signaling protocol during operation of the air to ground two-way communication system. The computer program product also includes program code to communicate between the ground base station antenna array and the aircraft over a narrow beam.

In yet another aspect, an apparatus for real-time calibration of an air to ground two-way communication system is described. The apparatus includes at least one processor; and a memory coupled to the at least one processor. The processor(s) is configured to calibrate a ground base station antenna array according to forward link calibration coefficients received from an aircraft as part of a communication signaling protocol during operation of the air to ground two-way communication system. The processor(s) is further configured to communicate between the ground base station antenna array and the aircraft over a narrow beam.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The spectrum available for Internet communication to aircraft by terrestrial Air to Ground (ATG) systems has been limited for practical and economic reasons. Providing seamless communication with aircraft flying at high altitudes over a large area (such as the continental U.S.) involves spectrum that is available over the large area. That is, the spectrum assigned to the ATG system should be available nationwide. It has been problematic, however, to identify a portion of spectrum that is available nationwide, much less arranging to free up such a portion of spectrum that has been allocated for other uses.

A large amount of spectrum has been assigned to geostationary satellites for use in broadcast TV and two way FSS (Fixed Satellite Service). Aspects of the present disclosure provide a high data rate aircraft to ground communication antenna system for sharing portions of the spectrum between ATG applications and geostationary satellite communication systems. Frequency bands such as C band (4 GHz downlink, 6 GHz uplink), Ku band (12 GHz downlink, 14 GHz uplink) and Ka band (20 GHz downlink, 30 GHz uplink) are currently used by geostationary satellite systems. In one aspect, a high data rate aircraft to ground communications antenna system may share the Ku uplink band to provide an aircraft with Internet service.

Aspects of the present disclosure provide methods and apparatus for an ATG system in which Ground Base Stations (GBSs) in communication with aircraft transceivers (ATs) in airplanes can use an uplink portion of spectrum assigned for satellite systems without intolerable interference with communications on the satellite systems. The systems and techniques described in the present disclosure may allow coexistence of the incumbent satellite system and the new ATG system on the same spectrum with negligible cross interference between the two systems.

Figure 1:
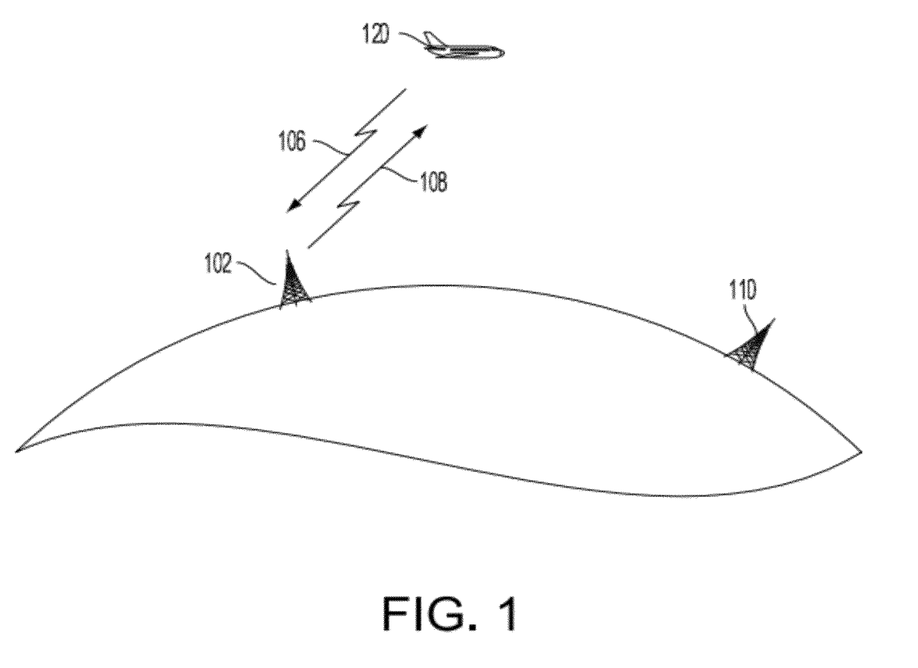
FIG. 1 is a block diagram conceptually illustrating an example of an air to ground communication system according to an aspect of the present disclosure.

A system 100 for wireless communication according to an illustrative aspect of the present disclosure is described in FIG. 1. In one aspect, the system 100 includes a ground base station 102 that transmits and receives signals on a satellite uplink band using a forward link (FL) 108 and a reverse link (RL) 106. An aircraft transceiver (AT) 120 in communication with the ground base station 102 may also transmit and receive signals on the satellite uplink band using the forward link 108 and reverse link 106. In one aspect, the aircraft transceiver 120 may include a multi-beam switchable array antenna. Another ground base station 110 is also shown.

In one aspect, the aircraft transceiver 120 may include an aircraft antenna that is comprised of a multi-beam switchable array that is able to communicate with the ground base station 102 at any azimuth angle. The aircraft antenna may be mounted below the fuselage with a small protrusion and aerodynamic profile to reduce or minimize wind drag. In one aspect, the antenna elevation coverage is from approximately 3° to 10° below horizon. The antenna array may include N elements positioned such that each element directs a separate beam at different azimuth angles, each covering 360/N degrees, for example, as shown in FIG. 2.

Figure 2:
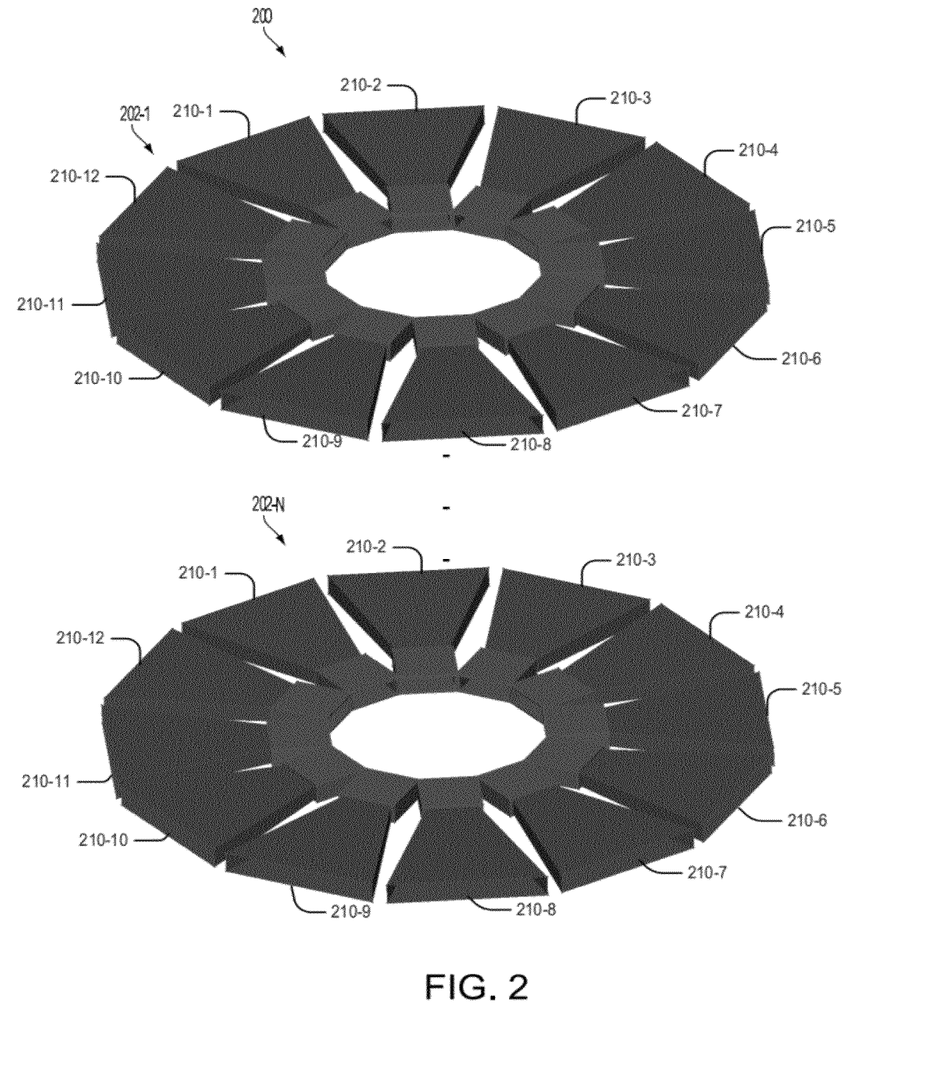
FIG. 2 is a diagram conceptually illustrating an example of an aircraft antenna system according to an aspect of the present disclosure.

FIG. 2 shows one example of an aircraft antenna array system 200 having multiple twelve-beam arrays 202 (202-1, . . . , 202-N) operating at, for example, 14 gigahertz (GHz). Representatively, the aircraft antenna array 202-1 has twelve horn antennas 210 (210-1, . . . , 210-12) each covering 30° sectors in azimuth with an aperture size of approximately 2.0 inches×0.45 inches, and having a gain of >10 dBi (dB isotropic). In one aspect, an overall diameter of the antenna array is roughly 8 inches.

Although FIG. 2 illustrates the aircraft antenna arrays 202 in a twelve-beam array configuration, it should be recognized that other configurations are possible while remaining within the scope of the present disclosure and appended claims. In particular, one example configuration includes four-antenna arrays 202 in a four-beam array configuration. In one aspect, the multiple aircraft antenna arrays 202 enable ground base station search at different elevations. In one aspect, the multiple antenna arrays 202 enable sectorization of the ground base station antenna search in elevation. In this aspect, each element is coupled to its own transceiver. As described in further detail below, the ground base station search enables a handoff between the aircraft transceiver 120 and a next ground base station, such as a ground base station 110, as shown in FIG. 1.

In one aspect, the aircraft antenna array system 200 is mounted below the fuselage and an auxiliary antenna is mounted onto a separate portion of the aircraft to improve aircraft Internet service. In particular, banking or rolling of the aircraft during flight may interrupt communication between the aircraft antenna array system 200 mounted below the fuselage and the ground base station 102. In one aspect, the auxiliary antenna reduces disruption of the communication between the aircraft transceiver 120 and the ground base station 102 when the aircraft banks or rolls by handling the communications with the ground base station during these times. Characteristics of the aircraft antenna 200 are further illustrated in FIGS. 3A and 3B.

Figure 3A:
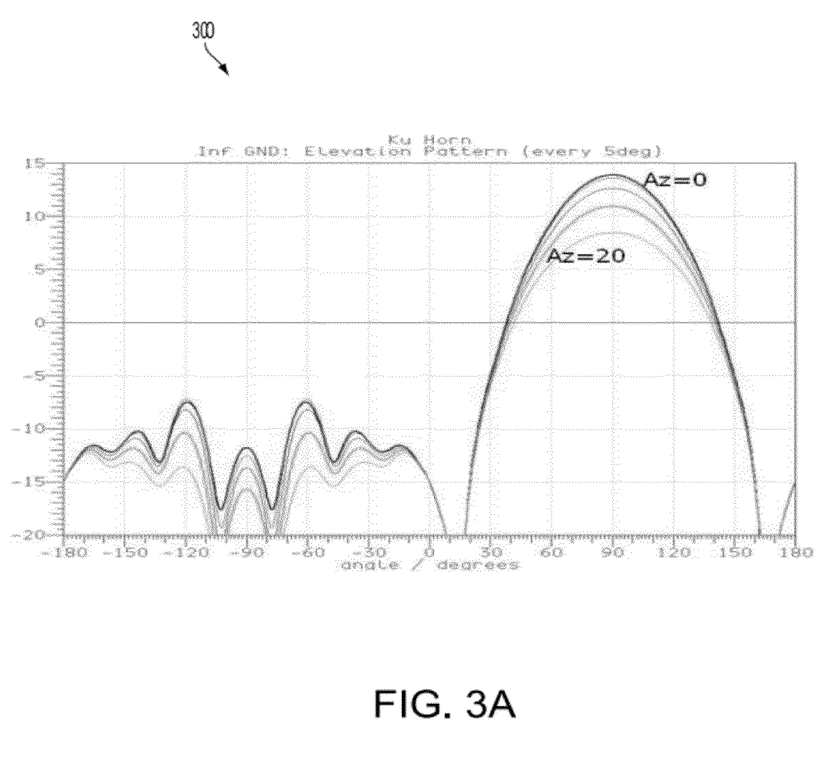
FIG. 3A is a diagram conceptually illustrating an example of a simulated gain pattern vs. an elevation angle of each antenna element of FIG. 1 over an infinite ground plane according to an aspect of the present disclosure.
Figure 3B:
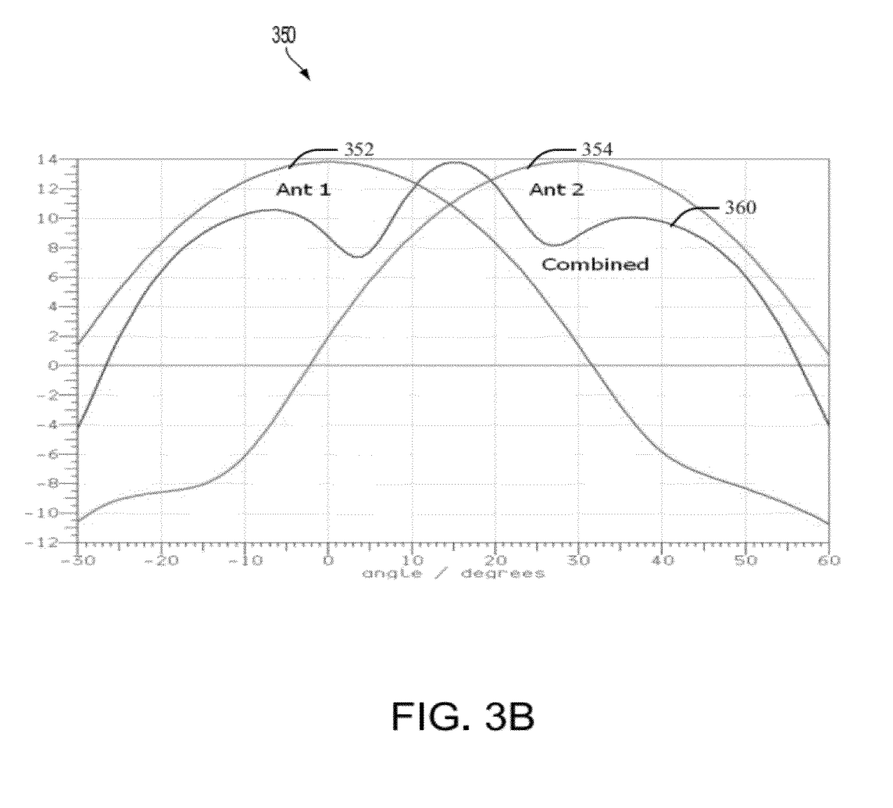
FIG. 3B is a diagram conceptually illustrating an example of a simulated gain pattern vs. an azimuth angle of adjacent antenna elements of FIG. 1 and a combined beam according to an aspect of the present disclosure.

FIG. 3A illustrates a diagram 300 of a simulated elevation gain pattern of a single antenna element 210 at azimuth angles of 0, 5, 10, 15 and 20 degrees, according to one aspect of the present disclosure. Representatively, the x-axis in FIG. 3A represents the theta angle in spherical coordinates where the horizon is at 90°. Because the simulation is performed over an infinite ground plane, the gain pattern above horizon (between −90 and 90) is duplicated due to image theory and should be ignored. FIG. 3B shows a diagram 350 of the simulated azimuth gain pattern 352 and 354 of two adjacent elements and a digitally combined beam 360 according to one aspect of the present disclosure.

Operation of the aircraft antenna 200 for providing aircraft Internet service involves detection and aircraft modem handoff between a current ground base station 102 and a next ground base station 110, as shown in FIG. 1. Various schemes of communication and searching can be employed by the antenna system. In one aspect, a single receive chain is used for communication, with searching being performed in a sequential, time division manner. In another aspect, two receive chains may be used, with one chain for ground station communication and the other chain for ground base station search. In the two receive chain configuration, the searching chain can also be used for diversity combining to increase the gain and throughput while not searching. Ground base station search may be performed as follows.

In one aspect, ground base station search may include a search of all pilot signals received from ground base stations on a given aircraft antenna element. The received pilot signals are ranked to determine whether or not the aircraft modem should handoff to another ground base station from which it is receiving a stronger pilot signal. Once the search on one antenna element is complete, the search may switch to another element and repeat the pilot search on that element. In one aspect, each of antenna elements 210-2 to 210-12 may continually search for ground stations while data is received by antenna element 210-1, as shown in FIG. 2.

In the configurations described above, a switched antenna scheme involves a transceiver that switches between different antenna elements to achieve high gain while maintaining low complexity. Alternatively, the directional beams may be formed by combining multiple antenna elements using phased array techniques. In one aspect, the switched antenna scheme described above may combine two adjacent beams 352 and 354 to form combined beam 360 for further increasing the antenna gain while only slightly increasing the hardware complexity to provide diversity. In one aspect, the switched antenna scheme may use a partial phased array beam combining of adjacent antenna elements. For example, adjacent beams may be combined to improve system performance when a communicating ground base station is at or near a boundary of the adjacent beams.

Figure 4:
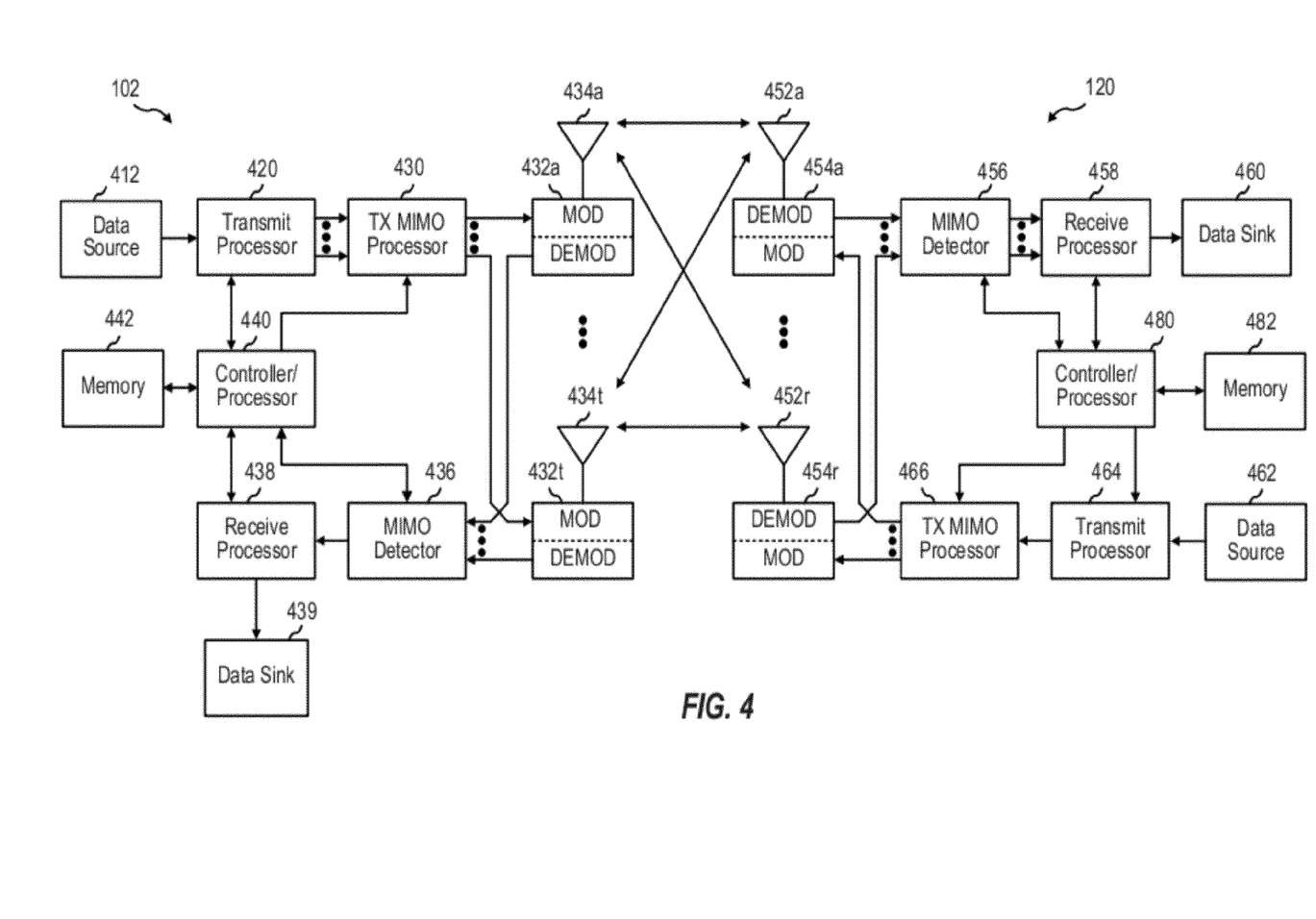
FIG. 4 is a block diagram conceptually illustrating a ground station antenna array system and an aircraft antenna system according to an aspect of the present disclosure.

FIG. 4 shows a block diagram of a design of a ground base station 102 and an aircraft transceiver 120. The ground base station 102 may be equipped with antennas 434a through 434t, and the aircraft transceiver 120 may be equipped with antennas 452a through 452r.

At the ground base station 102, a transmit processor 420 may receive data from a data source 412 and control information from a controller/processor 440. The processor 420 may process (e.g., encode and symbol map) the data and control information to obtain data symbols and control symbols, respectively. The processor 420 may also generate reference symbols. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink/forward link signal. Downlink signals from modulators 432a through 432t may be transmitted via the antennas 434a through 434t, respectively.

At the aircraft transceiver 120, the antennas 452a through 452r may receive the downlink/forward link signals from the ground base station 102 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the aircraft transceiver 120 to a data sink 460, and provide decoded control information to a controller/processor 480.

On the reverse link/uplink, at the aircraft transceiver 120, a transmit processor 464 may receive and process data from a data source 462 and control information from the controller/processor 480. The processor 464 may also generate reference symbols for a reference signal. The symbols from the transmit processor 464 may be precoded by a TX MIMO processor 466 if applicable, further processed by the modulators 454a through 454r, and transmitted to the ground base station 102. At the ground base station 102, the uplink/reverse link signals from the aircraft transceiver 120 may be received by the antennas 434, processed by the demodulators 432, detected by a MIMO detector 436 if applicable, and further processed by a receive processor 438 to obtain decoded data and control information sent by the aircraft transceiver 120. The processor 438 may provide the decoded data to a data sink 439 and the decoded control information to the controller/processor 440.

The controllers/processors 440 and 480 may direct the operation at the ground base station 102 and the aircraft transceiver 120, respectively. The processor 440 and/or other processors and modules at the ground base station 102 may perform or direct the execution of various processes for the techniques described herein. The processor 480 and/or other processors and modules at the aircraft transceiver 120 may also perform or direct the execution of the functional blocks illustrated in use method flow chart of FIG. 8, and/or other processes for the techniques described herein. The memories 442 and 482 may store data and program codes for the ground base station 102 and the aircraft transceiver 120, respectively.

Figure 5:
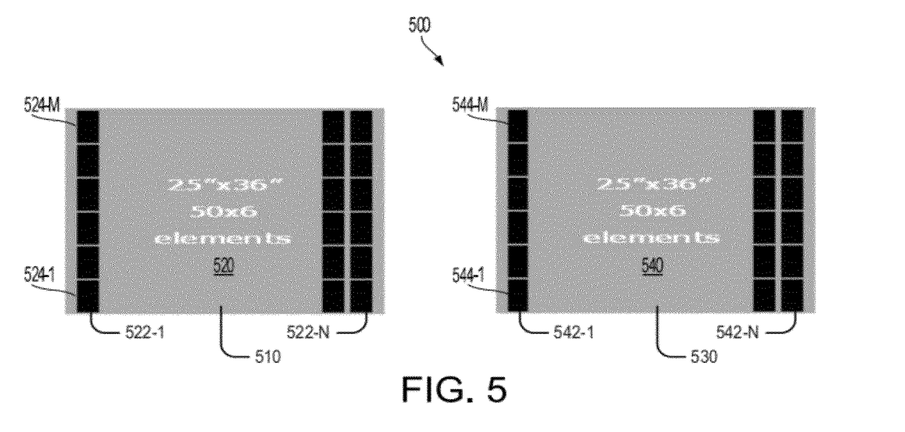
FIG. 5 is a block diagram conceptually illustrating a ground station antenna array system according to one aspect of the present disclosure.
Figure 6:
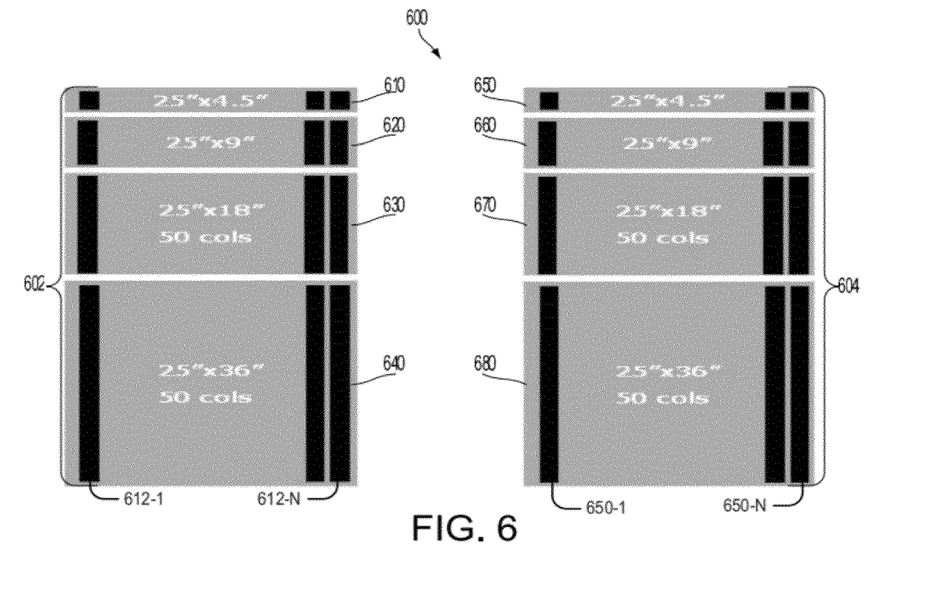
FIG. 6 is a block diagram conceptually illustrating a ground station antenna array system according to a further aspect of the present disclosure.

Ground station antenna array systems including antenna arrays for communicating with aircraft antenna 200 are shown in FIGS. 5 and 6 according to aspects of the present disclosure. In one aspect, a ground station antenna array system may include high gain multi-beam antenna arrays capable of communicating with multiple aircrafts simultaneously, for example, as shown in FIGS. 5 and 6. FIGS. 5 and 6 show two examples of the sectorization and antenna array configurations according to aspects of the present disclosure.

In one aspect, sectorization may include splitting sectors in elevation to increase system throughput, for example, as shown in FIGS. 5 and 6. Representatively, the coverage region in azimuth and elevation may be divided into narrow regions where the antenna array can maintain its gain requirement over all angles in the coverage area. In one configuration, the antennas may be operated in the 14 GHz range with a coverage region of 120° in azimuth and 0.5° to 10° in elevation. The ground base station antenna gain may be 40 dBi at 0.5° elevation and is reduced to 25.5 dBi at 10° elevation due to lower path loss to the aircraft.

Referring again to FIG. 5, FIG. 5 depicts a configuration of a ground base station antenna array system 500 with two antenna panels 510 and 530 each covering 60° in azimuth. In one aspect, each antenna panel 510/530 may consist of an N×M array 520/540 of antenna elements 522 (522-1, ..., 522-N), 524 (524-1, ..., 524-N), 542 (542-1, ..., 542-N), and 544 (544-1, ..., 544-N), respectively, which may be referred to herein as ground station antenna arrays. In one aspect, each antenna element includes a transmit/receive (T/R) module. Representatively, ground station antenna arrays 520 and 540 include 50×6 antenna elements; however, other configurations are possible while remaining within the scope of the described aspects and appended claims. In one aspect, digital beam forming may be employed to combine the signal and achieve the overall gain desired. The digital beam forming may be computed over the antenna elements in different columns and rows of each panel.

FIG. 6 depicts a configuration of a ground station antenna array system 600 in which number of antenna panels 610, 620, 630, and 640/650, 660, 670, and 680 covering the elevation is increased to four and the number of panels 602 and 604 covering the azimuth is maintained at two. In one aspect, the aperture size for the panels (610/650) covering higher elevations is smaller than the aperture size for the panels (640/680) covering low elevations due to lower gain required at higher elevations. Each antenna array 612 (612-1, ..., 612-N)/650 (650-1, ..., 650-N) may include 50×1 elements where digital beam forming is applied. In one aspect, generation of the digital beam is switched, for example, between adjacent panels 610/650 to next adjacent panels 620/660 depending on an elevation of the aircraft.

Other configurations that utilize a smaller number of elements for digital beam forming can be achieved by further reducing the coverage region of each panel in azimuth and increasing the antenna aperture of the elements while maintaining the array size. This can lead to a larger overall ground station antenna array size but less complicated digital signal processing. In one aspect, a single element can be used for each sector without any digital beam forming, which corresponds to 100×4 antennas in the above example.

In one aspect, digital beam forming may be used in each array to provide multiple steerable pencil-beams. The signal for each element of the array may pass through a T/R (transmit/receive) module and is converted into baseband. In one aspect, the phase shifts for a directional beam are calculated by a beam steering computer and applied to each signal. Similar phase factors may be applied to the transmit signal and passed through the transmit/receive module into the antenna element. In one aspect, a calibration procedure equalizes the amplitude and phase of each element and accounts for the time variation of the circuitry.

As mentioned above, calibration compensates for the different phase/amplitude responses of the antenna and transmit/receive units. One type of calibration may be performed in the factory using built in circuitry. This calibration may use any well known technique. The built in calibration scheme may also be used for periodic calibration in the field to track changes due to temperature and aging. Another approach for calibration may be built into the air interface to provide real-time calibration while performing two-way communication between a ground base station and an aircraft modem. In one aspect, calibration is periodically performed using the communication signaling of an air interface. In particular, an over the air (OTA) real-time calibration may be performed while an air to ground two-way communication system operates.

In one aspect, the Forward Link (FL) on the Ground Base Station (GBS) unit periodically transmits a pilot signal on a wide beam that covers the whole sector. As described herein, the periodically transmitted pilot signal on the forward link of the ground base station may be referred to as a Sector Wide Pilot (SWP). In one aspect, the sector wide pilot may allow an aircraft to detect new ground base stations, to synchronize to the ground base stations, and to receive system parameters, such as information on a periodic calibration procedure described below. For example, as shown in FIG. 1, the ground base station 102 may transmit a sector wide pilot over forward link 108.

In one aspect, the wide beam used to transmit the sector wide pilot may be formed by transmitting on any of the individual ground station antenna array elements (522, 524, 542, 544, 612, or 650), for example, as shown in FIGS. 5 and 6. The aircraft modem may detect this sector wide pilot as part of its search procedure. One possible real time procedure to calibrate the transmit elements of the ground station antenna array elements is performed as follows.

In one aspect, the ground base station periodically enters a calibration mode. The time of the calibration mode may be sent on the forward link on the same wide beam that carries the sector wide pilot. Calibrating the transmit side of the ground station antenna array may be initially performed. In particular, the ground base station transmitter may sequentially send the sector wide pilot on all ground station antenna array elements during a time period assigned to calibration. Following demodulation, the signal received at the aircraft from the k-th ground station antenna array element is given by:

$$(\alpha_k e^{-j\theta_k})(\beta_k e^{-j\phi_k})(\delta_k e^{-j\nu_k})(\sigma_k e^{-j\vartheta_k}) \qquad (1)$$

In equation (1), the first term may correspond to gain ($\alpha_k$) and delay ($\theta_k$) in the RF chain. The second term may correspond to the amplitude ($\beta_k$) and phase ($\phi_k$) of coupling between antenna elements. The third term may correspond to the phase ($\nu_k$) from antenna array spacing. The last term may correspond to multipath fading amplitude ($\sigma_k$) and phase ($\vartheta_k$). Also, j in equation (1) represents the imaginary part of a complex number.

In one aspect, the first three terms are due to the hardware and can be estimated by averaging out the last term by making a number of temporal measurements. For instance, given the high speed at which the aircraft travels, channel changes occur very rapidly (e.g., on the order of milliseconds). In on aspect, a number of measurements of equation (1) may be made over two millisecond intervals. These separate measurements may then be filtered to average out the last term in equation (1), which is due to multipath. In equation (1), the last term may assume that either the channel is frequency non-selective or that the measurements are made over a narrow bandwidth such as on individual tones of an OFDM (orthogonal frequency division multiplexing) physical layer.

In one aspect for a wide bandwidth system, the signals may be sent on a sufficient number of tones to ensure calibration of the hardware over all frequencies. The aircraft modem may compute the calibration coefficients as described above and transmits the coefficients to the ground base station so the ground base station may use these coefficients for forward link beam forming toward the aircraft, for example, as shown in FIG. 1.

Figure 7:
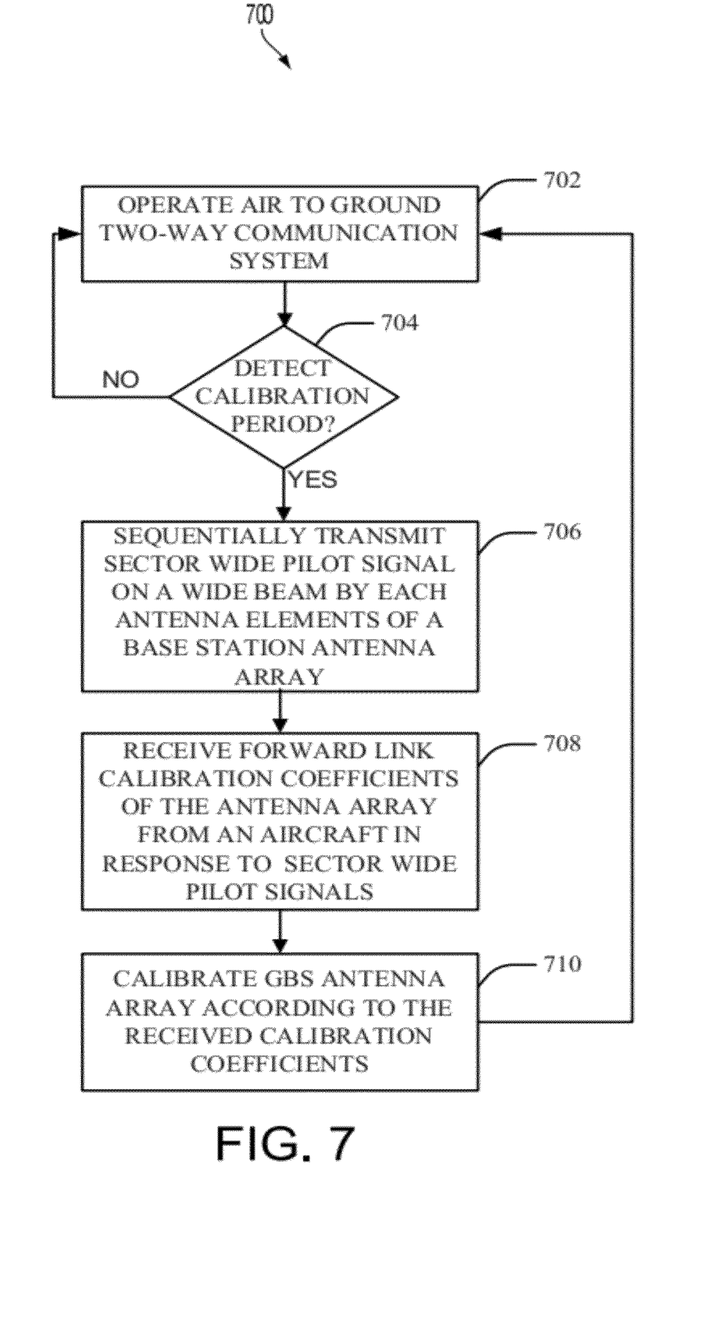
FIG. 7 is a flow diagram showing a process for real-time calibration of an air to ground two-way communication system including a ground station antenna array system according to an aspect of the present disclosure.

A process for real-time calibration of an air to ground two-way communication system may be performed as follows. FIG. 7 is a flow chart illustrating a method 700 for real-time calibration of an air to ground two-way communication system including a ground station antenna array system according to one aspect of the present disclosure. At process block 702, the air to ground two-way communication system operates to provide Internet service for an aircraft, for example, as shown in FIG. 1. At process block 704 it is determined whether a calibration period is detected during operation of the air to ground two-way communication system. Until a calibration period is detected, operation of the air to ground two-way communication system continues. Once a calibration period is detected, calibration of a base station antenna system may be performed as follows.

At process block 706, a sector wide pilot signal is sequentially transmitted on a wide beam by each antenna element of a base station antenna array. In one aspect, the antenna 500 (FIG. 5) may transmit a Sector Wide Pilot (SWP) on each element of the ground station antenna arrays 520 and 540. In the configuration illustrated in FIG. 6, the ground station antenna system 600 may transmit the sector wide pilot on one of the adjacent antenna panels 610 and 650, 620 and 660, 630 and 670, or 640 and 680 depending on an elevation of the aircraft.

Referring again to FIG. 7, at process block 708 forward link calibration coefficients of the antenna array may be received from an aircraft in response to the sector wide pilot signals during the calibration periods. In one aspect, the calibration coefficients characterize the sector wide pilot signals received by the aircraft. At process block 710, real-time calibration of an antenna array of the ground station antenna array system is performed according to the received calibration coefficients using, for example, equation (1) in accordance with one aspect of the present disclosure.

In one aspect, the receive side calibration may be performed in a manner similar to the above scheme but by having the aircraft modem transmit a pilot sequence on the Reverse Link (RL) 106, as shown in FIG. 1. The pilot signal may be sent with a sufficient amount of energy and with a sufficient amount of time duration to enable detection at each of the antenna elements at the ground base station. Similar to the scheme described above for calibrating the transmit chain, in one aspect the receive chain's phase and amplitude may be estimated by averaging over any variations due to multipath fading.

Once the ground base station and aircraft antennas are calibrated, beam forming may be performed in any number of ways. In one aspect, the aircraft sends its position to the ground base station based on a current position location, which may be determined with, for example, a position location system such as a global positioning system (GPS). The ground base station may use this information to form a beam in the direction of the aircraft and also on the receive side at the ground base station. In a calibrated antenna system, knowledge of the position of the aircraft and the ground base station can be used to calculate the phased array antenna coefficients to point the bore sight of the beam toward the location of the aircraft. During the flight, the beam may be adjusted using the position of the aircraft that is periodically reported to the ground base station, according to one aspect of the present disclosure.

In one aspect, the aircraft and the ground base station may adjust their beams to increase or maximize Signal to Noise Plus Interference (SINR) received at the aircraft and at the ground base station. For instance, the ground base station may slightly move its transmit beam. The aircraft will report SINR measurements received at the aircraft to the ground base station. In one aspect, the ground base station may find the improved or optimal transmit beam by adjusting its beam based on the SINR feedback received from the aircraft. In one aspect, the ground base station may send one or more adjacent beams to determine whether one of the adjacent beams provides improved performance based on, for example, measured signal energy. In one aspect, detection of an improved or optimal beam may be used on the reverse link from the aircraft to the ground base station.

In TDD (Time Division Duplex) channels where the forward link and reverse link are reciprocal, except for the hardware phase and delays which are calibrated, the ground base station may determine the desired or best received beam by comparing SINRs received on adjacent beams. Then, the ground base station may form a beam toward the aircraft based on the desired or optimal beam on its receive side. In one aspect, the ground base station repeatedly determines the desired or optimal receive beam and adjusts the transmit beam accordingly. A process for air to ground communication by an aircraft equipped with a multi-beam switchable array antenna may be performed as follows.

Figure 8:
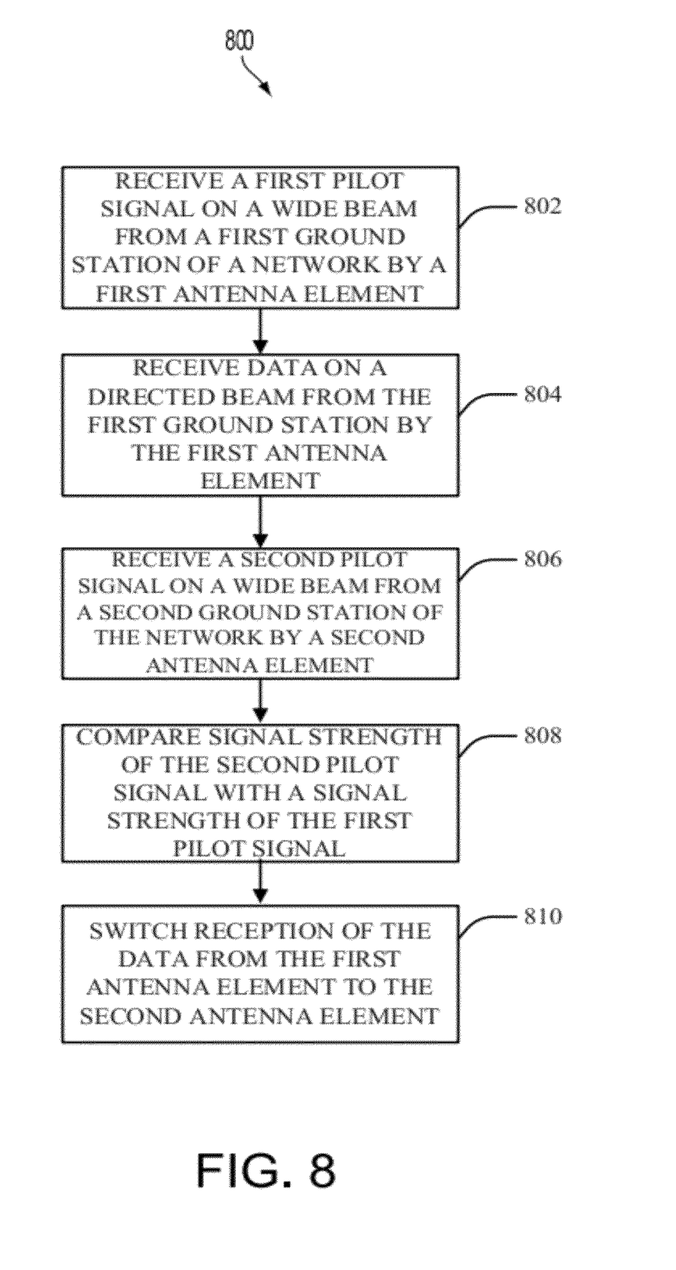
FIG. 8 is a flow diagram showing a process for air to ground communication by an aircraft equipped with a multi-beam switchable array antenna according to an aspect of the present disclosure.

FIG. 8 is a flow chart illustrating a method 800 for air to ground communication by an aircraft equipped with multiple antenna arrays of a multi-beam switchable antenna elements according to one aspect of the present disclosure. At process block 802, a first pilot signal is received on a wide beam from a first ground station of a network by a first antenna element of an antenna. In one aspect, the antenna 200 (FIG. 2) may receive a Sector Wide Pilot (SWP) on a first antenna element 210 (210-1, . . . , 210-12) covering a first range of azimuth angles from the aircraft. In the configuration illustrated in FIG. 2, the aircraft antenna 200 has twelve horn antennas 210 (210-1, . . . , 210-12) each covering 30° sectors in azimuth.

Referring again to FIG. 8, at process block 804 data is received on a directed beam from the first ground station by the first antenna element (e.g. 210-1). At process block 806, at least one second pilot signal is received on a wide beam from at least one second ground station of the network by a second antenna element of the antenna covering a second range of azimuth angles from the aircraft different than the first range of azimuth angles. For example, a sector wide pilot may be received from the second ground station 110 while data is being received from the first ground base station 102, as shown in FIG. 1.

As shown in FIG. 2, data may be received by the first antenna element 210-1 while a sector wide pilot is received by the second antenna element 210-2. In one configuration, each of the antenna elements 210-2 to 210-12 may continually search for ground stations while data is received by the antenna element 210-1. In an alternative aspect, a time division mode operates by using a single antenna element for receiving data, and when data is not being received, the remaining antenna elements may search for ground stations to determine whether to perform an aircraft modem handoff.

Referring again to FIG. 8, at process block 808 a signal strength of the second pilot signal(s) is compared with a signal strength of the first pilot signal. At process block 810, reception of the data may be switched from the first antenna element to the second antenna element in response to determining that the second pilot signal strength received by the second antenna is greater than the first pilot signal strength received on the first antenna element. In one aspect, the method 800, as shown in FIG. 8, is repeated for each aircraft antenna array 202 (FIG. 2) for configurations having multiple aircraft antenna arrays. In an alternative aspect, the method 800 is performed for a selected aircraft antenna array (e.g. 202-1).

Transmissions from non-geostationary satellite terminals may interfere with communications from a ground base station to an aircraft transceiver on a served aircraft. Also, other aircraft may interfere with communications from a ground base station to an aircraft transceiver on the served aircraft. In addition, signal degradation may be caused by rain when either the Ka band or the Ku band is used by an air to ground communication system. Aspects of the present disclosure may mitigate this type of interference and signal degradation to the aircraft terminal.

As shown in FIG. 1, the transmission power on the forward link 108 of ground base station 102 may be increased to overcome interference, with an equal decrease in the forward link transmission power of the ground base station 110. In one aspect, a ground base station controller/processor 440 (FIG. 4) is responsible for adjusting the transmission power among the various base stations so that the sum of the overall transmission power over the various ground base stations remains constant.

In particular, the aircraft receiver may measure the Signal to Interference plus Noise Ratio (SINR) and send an index of the measured SINR to the ground base station. In one aspect, the ground base station adjusts the transmit power on the forward link beam to maintain the SINR received at the aircraft above a target value. In case of rain, the signal becomes attenuated, resulting in a reduction in the received SINR at the aircraft. Each beam may be allowed a maximum transmit power. The base station controller will impose a limit on the overall transmit power from all ground base stations. In case of interference from other systems into the aircraft receiver, the interference term of SINR will increase, reducing the SINR received by the aircraft. In one aspect, the ground base station controller may increase the forward link power in response to the SINR feedback from the aircraft modem.

Figure 9:
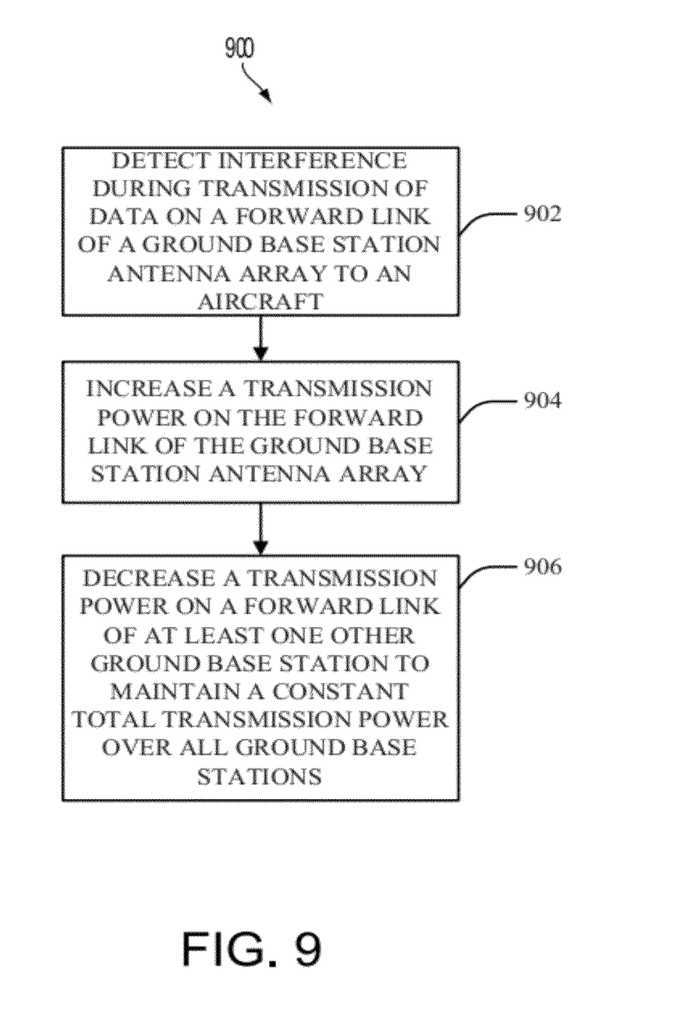
FIG. 9 is a flow chart illustrating a process for increasing a transmission power on a forward link from a serving ground base station to mitigate aircraft interference according to one aspect of the present disclosure.

FIG. 9 is a flow chart illustrating a method 900 for increasing a transmission power on the forward link from a serving ground base station to mitigate aircraft interference according to one aspect of the present disclosure. At process block 902, interference is detected during transmission of data on a forward link of a ground base station antenna array from the serving ground base station to the aircraft. At process block 904, the serving ground base station may increase a transmission power on the forward link to mitigate aircraft interference. In one aspect, increasing the transmission power for the serving ground base station involves an equal decrease in transmission power of one or more other ground base stations. Accordingly, at process block 906, a decrease in transmission power of one or more other ground base stations is performed. In one aspect, the decrease in transmission power is performed so that the sum of the overall transmission power over the various ground base stations remains constant.

In one configuration, a ground base station 102 is configured for wireless communication including means for calibrating a ground base station antenna array according to forward link calibration coefficients received from an aircraft as part of a communication signaling protocol during operation of the air to ground two-way communication system. In one aspect, the calibrating means may be the controller/processor 440, and/or memory 442 of FIG. 4. The ground base station is also configured to include a means for communicating between the ground base station antenna array and the aircraft over a narrow beam. In one aspect, the communicating means may the ground base station antenna array as shown FIGS. 5 and 6, and/or the antenna 434a-r, demodulator 434a-r, transmit processor 420, controller/processor 440, and/or memory 442 of FIG. 4. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for real-time calibration of an air to ground two-way communication system, comprising:
   sequentially transmitting a sector wide pilot signal on a wide beam by each of a plurality of antenna elements of an antenna array of a ground base station during at least one calibration period;
   entering a calibration mode at an agreed time, the agreed time being sent to an aircraft using the sector wide pilot signal;
   receiving forward link calibration coefficients over a reverse link from the aircraft to the ground base station in response to the sector wide pilot signals transmitted during the at least one calibration period, the forward link calibration coefficients characterizing the sector wide pilot signals received by the aircraft from the ground base station, and the sector wide pilot signals being based at least in part on a multipath fading in open space between the aircraft and the ground base station; and
   calibrating the ground base station antenna array in real-time based at least in part on a current position of the aircraft and according to the forward link calibration coefficients received from the aircraft as part of a communication signaling protocol for performing two-way normal traffic communication within the air to ground two-way communication system over a narrow beam.

2. The method of claim 1, further comprising:
   transmitting notification of the at least one calibration time period by the ground base station on at least one of the antenna elements on the wide beam.

3. The method of claim 1, in which the at least one calibration period comprises a predetermined time slot within an air interface architecture of the air to ground two-way communication system.

4. The method of claim 1, in which the sequentially transmitting comprises transmitting the sector wide pilot signal on multiple tones to ensure calibration across wide frequencies.

5. The method of claim 1, further comprising:
   receiving a reverse link pilot signal by each of the plurality of antenna elements of the ground base station antenna array during at least one calibration period;
   demodulating the reverse link pilot signals; and
   computing reverse link calibration coefficients of an aircraft antenna array characterizing the demodulated reverse link pilot signals.

6. The method of claim 1, in which the narrow beam is transmitted over an azimuth of less than 60°.

7. An apparatus for wireless communication, comprising:
   means for sequentially transmitting a sector wide pilot signal on a wide beam by each of a plurality of antenna elements of a ground base station antenna array during at least one calibration period;
   means for entering a calibration mode at an agreed time, the agreed time being sent to an aircraft using the sector wide pilot signal;
   means for receiving forward link calibration coefficients over a reverse link from the aircraft to the ground base station in response to the sector wide pilot signals transmitted during the at least one calibration period, the forward link calibration coefficients characterizing the sector wide pilot signals received by the aircraft from the ground base station, and the sector wide pilot signals being based at least in part on a multipath fading in open space between the aircraft and the ground base station; and
   means for calibrating the ground base station antenna array in real-time based at least in part on a current position of the aircraft and according to the forward link calibration coefficients received from the aircraft as part of a communication signaling protocol for performing two-way normal traffic communication within an air to ground two-way communication system; and
   means for communicating between the ground base station antenna array and the aircraft over a narrow beam.

8. The apparatus of claim 7, further comprising:
   means for transmitting notification of the at least one calibration time period by a ground base station on at least one of the antenna elements on the wide beam.

9. The apparatus of claim 7, in which the at least one calibration period comprises a predetermined time slot within an air interface architecture of the air to ground two-way communication system.

10. The apparatus of claim 7, in which the sequentially transmitting means further comprises means for transmitting the sector wide pilot signal on multiple tones to ensure calibration across wide frequencies.

11. The apparatus of claim 7, further comprising:
    means for receiving a reverse link pilot signal by each of a plurality of antenna elements of the ground base station antenna array during at least one calibration period;
    means for demodulating the reverse link pilot signals; and
    means for computing reverse link calibration coefficients of an aircraft antenna array characterizing the demodulated reverse link pilot signals.

12. The apparatus of claim 7, in which the plurality of antenna elements are arranged as a plurality of rows of antenna elements and a plurality of columns of antenna elements.

13. The apparatus of claim 7, in which plurality of antenna elements are spread across a plurality of panels, each of the plurality of panels covering a respective elevation.

14. The apparatus of claim 13, in which the plurality of panels cover the same azimuth.

15. A non-transitory computer-readable medium having non-transitory program code recorded thereon, the program code comprising:
    program code to sequentially transmit a sector wide pilot signal on a wide beam by each of a plurality of antenna elements of a ground base station antenna array during at least one calibration period;
    program code to enter a calibration mode at an agreed time, the agreed time being sent to an aircraft using the sector wide pilot signal;

program code to receive forward link calibration coefficients over a reverse link from the aircraft to the ground base station in response to the sector wide pilot signals transmitted during the at least one calibration period, the forward link calibration coefficients characterizing the sector wide pilot signals received by the aircraft from the ground base station, and the sector wide pilot signals being based at least in part on a multipath fading in open space between the aircraft and the ground base station; and program code to calibrate the ground base station antenna array in real-time based at least in part on a current position of the aircraft and according to the forward link calibration coefficients received from the aircraft as part of a communication signaling protocol for performing two-way normal traffic communication within an air to ground two-way communication system over a narrow beam.

16. An apparatus for wireless communication, comprising:
a memory; and
at least one processor coupled to the memory, the at least one processor being configured:
to sequentially transmit a sector wide pilot signal on a wide beam by each of a plurality of antenna elements of a ground base station antenna array during at least one calibration period;
to enter a calibration mode at an agreed time, the agreed time being sent to an aircraft using the sector wide pilot signal;
to receive forward link calibration coefficients over a reverse link from the aircraft to the ground base station in response to the sector wide pilot signals transmitted during the at least one calibration period, the forward link calibration coefficients characterizing the sector wide pilot signals received by the aircraft from the ground base station, and the sector wide pilot signals being based at least in part on a multipath fading in open space between the aircraft and the ground base station; and to calibrate the ground base station antenna array of the ground base station in real-time based at least in part on a current position of the aircraft and according to the forward link calibration coefficients received from the aircraft as part of a communication signaling protocol for performing two-way normal traffic communication within an air to ground two-way communication system over a narrow beam.

17. The apparatus of claim 16, in which the processor is further configured to transmit notification of the at least one calibration time period by a ground base station on at least one of the antenna elements on the wide beam.

18. The apparatus of claim 16, in which the at least one calibration period comprises a predetermined time slot within an air interface architecture of the air to ground two-way communication system.

19. The apparatus of claim 16, in which the processor is further configured to transmit the sector wide pilot signal on multiple tones to ensure calibration across wide frequencies.

20. The apparatus of claim 16, in which the processor is further configured:
to receive a reverse link pilot signal by each of a plurality of antenna elements of the ground base station antenna array during at least one calibration period;
to demodulate the reverse link pilot signals; and
to compute reverse link calibration coefficients of an aircraft antenna array characterizing the demodulated reverse link pilot signals.

* * * * *